F. C. HALL.
DYNAMO ELECTRIC MACHINE.
APPLICATION FILED OCT. 20, 1908.
1,036,835.
Patented Aug. 27, 1912.
2 SHEETS—SHEET 1.
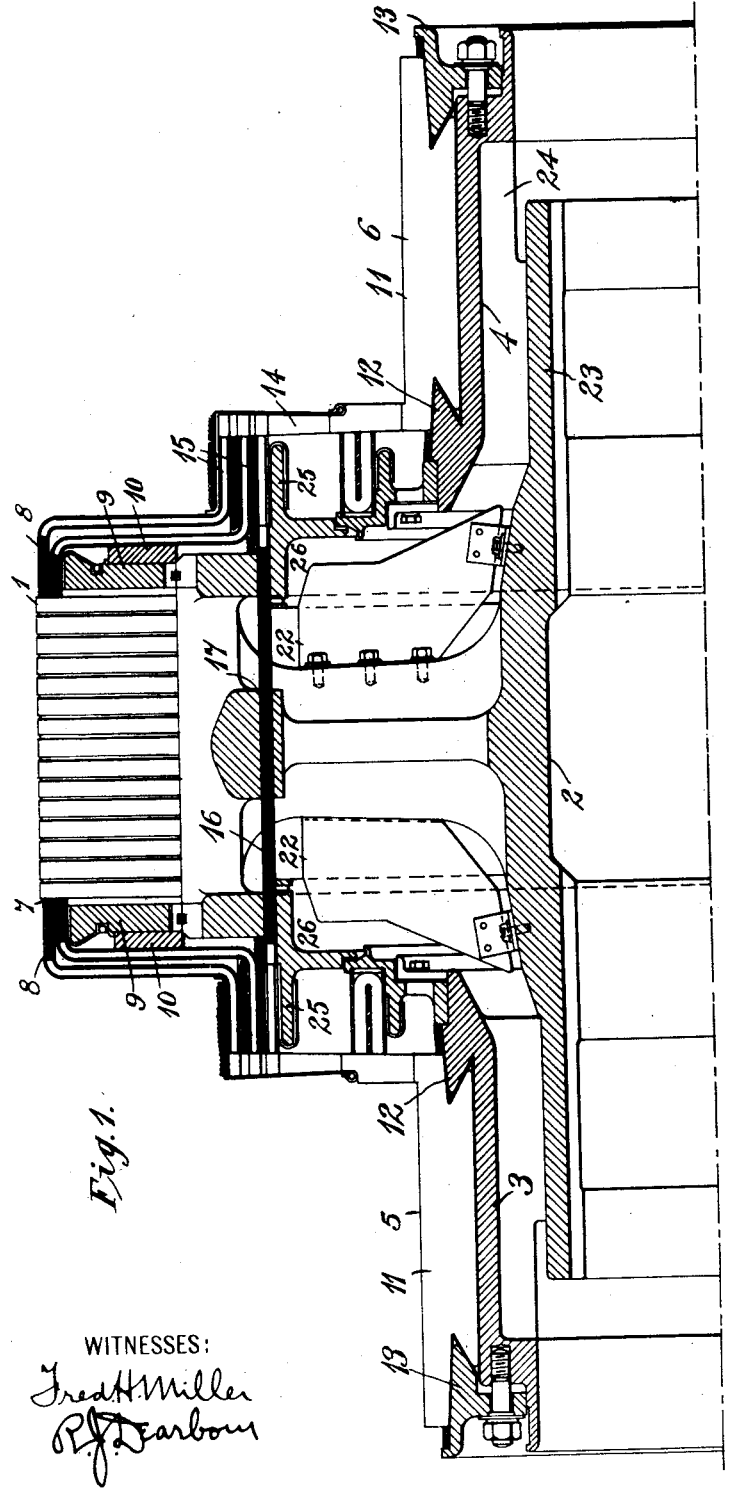
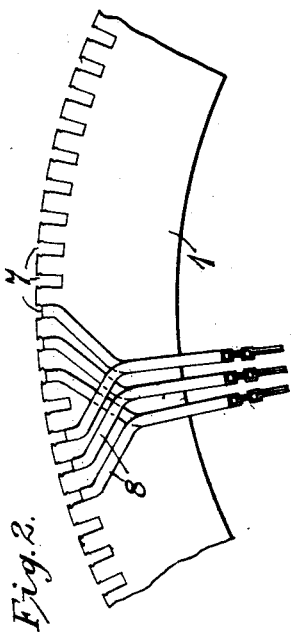
WITNESSES:
Fred H Miller
R J Dearborn
INVENTOR
Fred C. Hall
BY
Hesley E Carr
ATTORNEY

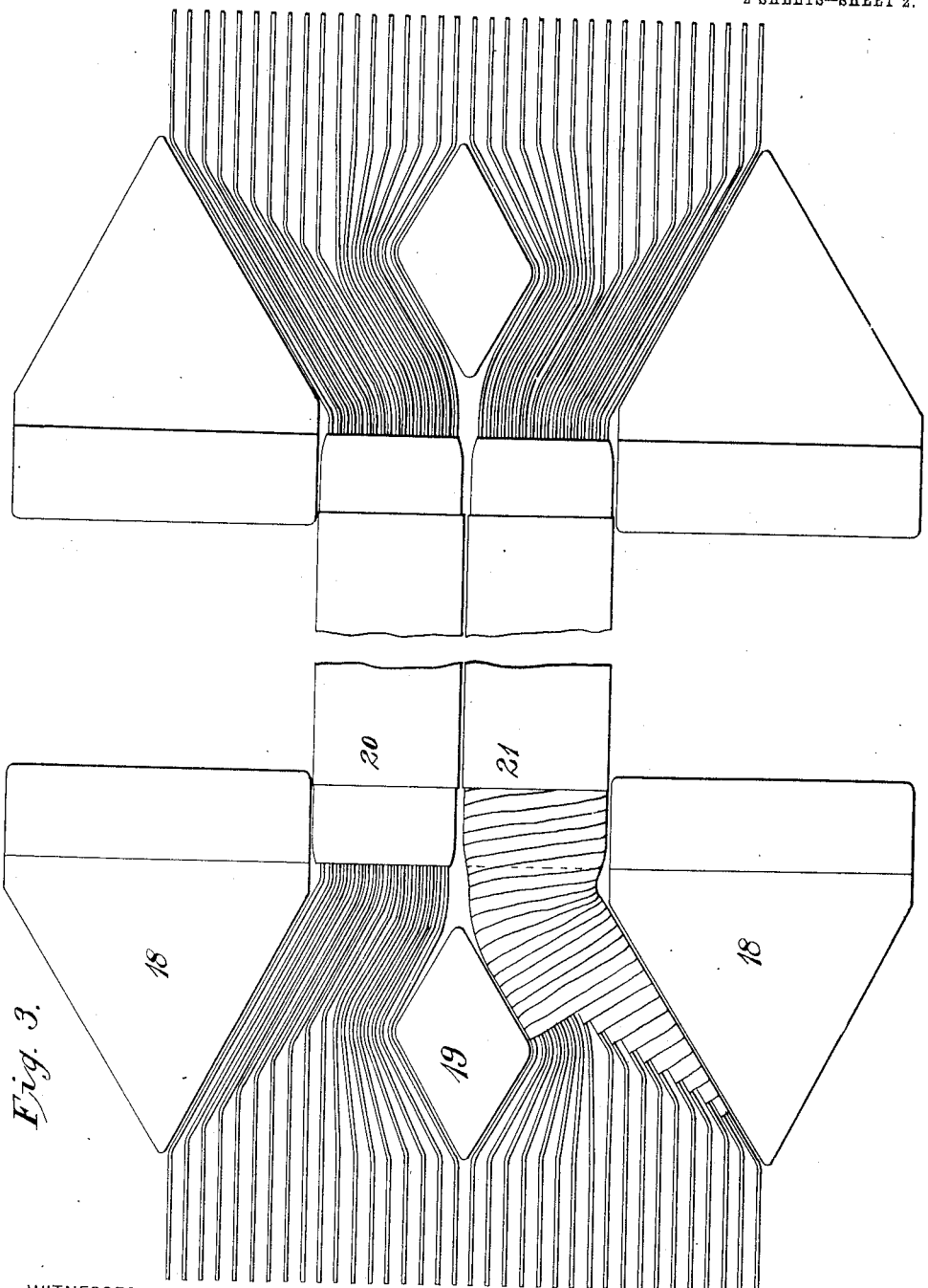

UNITED STATES PATENT OFFICE.

FRED C. HALL, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

DYNAMO-ELECTRIC MACHINE.

1,036,835.  Specification of Letters Patent.  Patented Aug. 27, 1912.

Application filed October 20, 1908. Serial No. 458,613.

*To all whom it may concern:*

Be it known that I, FRED C. HALL, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo electric machines and it has special reference to such direct current generators of large capacity as are provided with two commutators.

The object of my invention is to so improve the structure of a machine of the class above indicated as to facilitate its manufacture and adapt it for high speed operation.

It is desirable, in some cases, to equip direct current generators of large capacity with two commutators instead of one, in order to obtain an adequate contact surface without necessitating a commutator of abnormal length. This is particularly true when the machine is designed for operation at relatively high speeds, since it is difficult to build a very long commutator which is capable of resisting the centrifugal forces to which it is subjected under these conditions. When two commutators are used, it is desirable to connect their corresponding segments together by conductors which are preferably disposed between the laminated core structure and its supporting frame or spider. The above mentioned conductors are usually bent in an outward direction, at the points where they extend beyond the core structure, and are joined to the necks of the commutator segments adjacent to the point of connection between the armature coils and the necks.

According to my present invention I materially shorten the length of the commutator necks so that their outer extremities are substantially opposite the ends of the passageways through which the conductors which interconnect the two commutators extend. The end connecting portions of the armature coils are bent inwardly close to the ends of the core slots and the connectors which join the end connecting portions with the commutator necks extend outwardly in an axial direction, being substantially parallel to the extremities of the interconnecting conductors. By this arrangement the V shaped end connecting portions of the armature winding lie in a plane which is perpendicular to the axis of the machine instead of being disposed in the form of a cylinder as in the usual arrangement. Furthermore, the length of the interconnecting conductors is materially reduced while the amount of copper or other conducting material utilized in the armature winding and the commutator necks is substantially the same. The extremities of the interconnecting conductors and the connectors which join the commutator necks with the armature winding lie in concentric cylindrical surfaces and are separated from each other by insulating cylinders, the successive layers being firmly held in position against an annular projection on the rim of the spider which supports the core structure by means of band wire.

Figure 1 of the accompanying drawings is a sectional elevation of a portion of a dynamo electric machine constructed in accordance with my invention. Fig. 2 is a partial end elevation and Fig. 3 is a detail view showing the disposition of the extremities of the conductors which interconnect the segments of the two commutators of the machine.

Referring to the drawings, the device here illustrated comprises a hollow cylindrical laminated core member 1, which is supported on a spider 2 having cylindrical projections 3 and 4 for severally supporting a pair of similar commutators 5 and 6. The core member 1 is provided with a plurality of peripheral slots 7 in which armature coils 8 are partially included. The end portions of the coils are substantially V shaped and are bent inwardly close to the ends of the core slots, and are separated from the end frames 9 of the machine by means of wood blocks 10.

Each of the commutators 5 and 6 comprises a plurality of bars or segments 11 which are supported, in the usual manner, by projections 12 on the cylinders 3 and 4 and clamping V rings 13, which are adjustably secured to the outer ends of the cylinders. The bars 11 are provided with necks 14, which are secured to their inner ends and project radially therefrom. The extremities of the necks 14 are joined to the coils 8 by means of connectors 15, and the corresponding necks on the two commutators are joined by conductors 16, which are located in recesses 17 in the rim of the spider 2 and are not affected by the magnetic fluxes in the armature core 1.

It will be readily understood by those familiar with the art that a very large number of conductors will be required to interconnect all of the necks of the two commutators and, since they may only extend through the spider at certain intervals around its circumference, they are preferably wrapped into bundles, which are located in the recesses 17, as above indicated. The portions of the conductors which lie between the ends of the recesses 17 and the commutator necks must be carefully supported in order that the machine may safely operate at high speeds, and, in order to do this to the best advantage, I have provided V shaped spacing blocks 18 between the ends of adjacent recesses and "diamond" shaped spacing blocks 19 between the two bundles 20 and 21, into which the conductors disposed in each recess are divided.

The advantages gained from the use of the blocks referred to above are apparent from Fig. 3 of the drawings, from which it will be observed that the interconnecting conductors are kept close together for as great a part of the distance external to the recesses as is possible and consistent with the condition that they shall be equally spaced at their extremities. The "diamond" shaped blocks 19 and the V shaped spacing blocks 18 correspond in thickness to the widths of the strap conductors which they separate, and are mounted directly upon the cylindrical surfaces of the annular projections 25 which support the connectors 15 and the ends of the conductors 16.

While the structure illustrated is especially compact, it will be observed that the ventilation of the commutator necks and of the armature core and windings is not interfered with, a circulation of air being established through these parts by means of fan blades 22, which are secured to the arms of the spider. The cylindrical projections 3 and 4, on which the commutator segments are mounted, are materially larger than the inner sleeves or bushings 23, which are fitted directly upon the shaft of the machine (not shown), and they are supported from these bushings by means of integral arms 24, in order that longitudinal ventilating passageways may be established from the ends of the commutators to the chambers 26 which are formed between the arms of the spider and the commutator necks.

Since structural modifications may be effected within the spirit and scope of my invention, I desire that only such limitations shall be imposed as are indicated in the appended claims.

I claim as my invention:

1. In a dynamo electric machine, the combination with an armature core and two commutator cylinders located at the respective ends of the core, of conductors which are un-influenced by the armature core fluxes and the ends of which are uniformly spaced apart and connected to the commutator segments and the intermediate portions of which are in compact bundles, and insulating blocks for supporting and spacing the bundles of interconnecting conductors.

2. In a dynamo electric machine, the combination with an armature core and two commutator cylinders located at the respective ends of the core, of conductors which are un-influenced by the armature core fluxes and serve to interconnect the segments of the commutators, and means for supporting and spacing the interconnecting conductors, comprising V shaped blocks and "diamond" shaped blocks.

3. In a dynamo electric machine, the combination with a cylindrical armature core member, two commutator cylinders located at the respective ends of the core member, a winding associated with the core member, and a plurality of conductors which are un-influenced by the core member fluxes and serve to interconnect two commutators, of the annular supports which are concentric with the commutator cylinders and are of materially less diameter than the cylindrical core member, and means for securing portions of the winding and the ends of the interconnecting conductors to said annular supports.

In testimony whereof, I have hereunto subscribed my name this 15th day of Oct., 1908.

FRED C. HALL.

Witnesses:
Thos. S. Scott,
Birney Hines.